Figure 1:
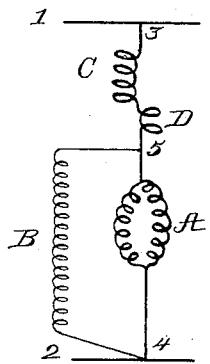

(No Model.) 2 Sheets—Sheet 1.

F. J. SPRAGUE.
ELECTRO DYNAMIC MOTOR.

No. 324,891. Patented Aug. 25, 1885.

ATTEST
E. A. Rowland
N. W. Kiddle

INVENTOR
Frank J. Sprague
By Dyer & Seely
Attys (No Model.) 2 Sheets—Sheet 2.

F. J. SPRAGUE.
ELECTRO DYNAMIC MOTOR.

No. 324,891. Patented Aug. 25, 1885.

UNITED STATES PATENT OFFICE.

FRANK J. SPRAGUE, OF NEW YORK, N. Y., ASSIGNOR TO THE SPRAGUE ELECTRIC RAILWAY AND MOTOR COMPANY.

ELECTRO-DYNAMIC MOTOR.

SPECIFICATION forming part of Letters Patent No. 324,891, dated August 25, 1885.

Application filed March 12, 1885. (No model.)

*To all whom it may concern:*

Be it known that I, FRANK J. SPRAGUE, of New York, in the county and State of New York, have invented a certain new and useful Improvement in Electro-Dynamic Motors, of which the following is a specification.

In my application, Serial No. 138,145, is set forth an electro-dynamic motor, in which the non-sparking points of the commutator-cylinder are maintained constant by opposing the distortion of the magnetic field due to variations in the armature-current by a counter-distortion dependent upon such variations, whereby the magnetic resultant due to the armature and field-magnet is unchanged, and the line of parallel cutting of the lines of force or point of least sparking is maintained in the same position.

This invention relates to a simple construction for a motor whereby this counter-distortion may be effectively produced.

In carrying my invention into effect I employ main field-magnet coils in shunt relation to the armature, differential field-magnet coils in series with the armature, and additional accumulative field magnet coils, also in series with the armature. The main field-coils may be shunted upon the armature alone, or upon the armature and both the cumulative and differential series coils, or upon the armature and either of said series coils, the other series coil remaining outside the terminal of the main field-shunt.

The proportions of the winding of all the field-magnet coils are preferably such as are set forth in my applications, Serial Nos. 138,146 and 138,147—that is, so that a zero-field is produced if circuit is closed to the shunt and series coils when the motor is at rest. This necessitates the employment of means for varying the magnetizing effect of the differential coils. Such means are set forth in the applications just referred to, and will be hereinafter described.

In accomplishing the counter-distortion of the field, the motor used is one in which the field magnet cores extend in different directions from the field of force in which the armature revolves. The differential series coils are wound or arranged so that their greatest effect is produced on diagonally opposite parts of the magnetic field and the cumulative series coils, so that their greatest effect is produced on the other diagonally opposite parts. The differential coils, are arranged to have a greater magnetizing effect than the cumulative coils. A decrease of load, causing a decreased armature-current, tends to shift the magnetic resultant of the armature and field-magnet; but this also decreases the magnetizing effect of all the series coils, and therefore the parts of the field principally affected by the cumulative coils are weakened, and those principally affected by the differential coils are strengthened, whereby a distortion of field is produced opposed to that produced by the decrease of armature-current, and hence the magnetic resultant—the line of parallel cutting and the points of least spark—remains unchanged. Thus no shifting of the commutator-brushes is ever required, except on account of wear. At the same time as the differential series coils predominate over the cumulative, the whole field-magnet strength is increased, and the speed of the motor is brought down to compensate for the decreased load.

The arrangement of two sets of series field-coils—one differential, the other cumulative—may be employed simply as a means of field-regulation where it is not desired to produce the counter-distortion. In such case the coils may be evenly wound on all the legs of the field-magnet and used only to regulate the motor, being wound in the proportions above set forth. The differential and cumulative series coils have a differential effect, which, as the differential coils predominate over the cumulative coils, produces a weakening of the total strength of the field magnet when the armature-current increases, and a strengthening of the field-magnet when the armature-current decreases, and so maintains constant the speed of the motor, as set forth in the applications referred to.

Figure 9:
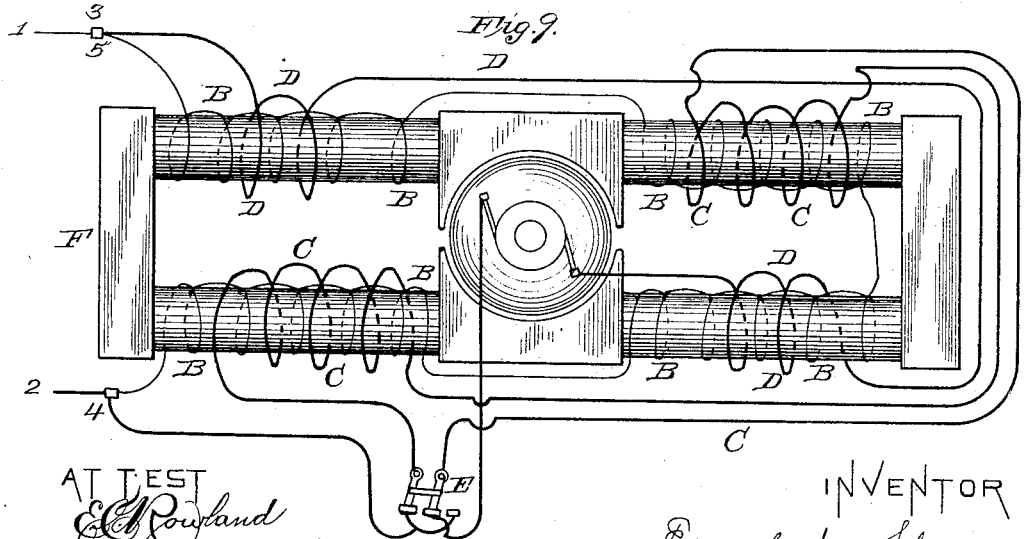
Figure 10:
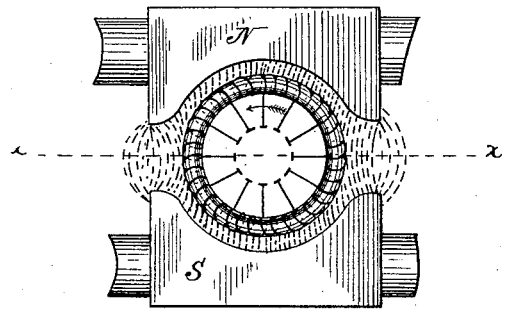
Figure 11:
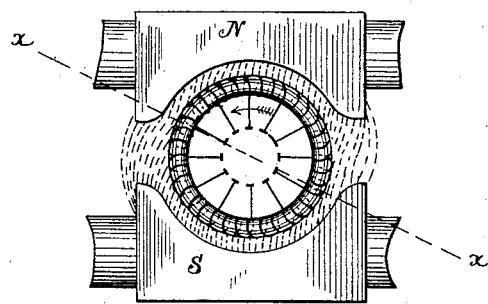
Figure 12:
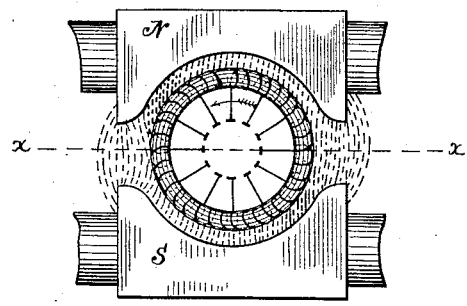

My invention is illustrated in the annexed drawings, in which Figures 1 to 8 are diagrams illustrating various arrangements of the motor-circuits which may be employed. Fig. 9 is a view of a motor embodying my invention; and Figs. 10, 11, and 12 are diagrams illustrating the distortion of the magnetic field.

In all these figures A is the armature, B the main or shunt field-coils, C the differential series field-coils, and D the cumulative series field-coils. 1 2 are the mains of a constant potential circuit with which I prefer to employ my invention. 3 4 are the motor-terminals, and 5 is a terminal of the armature or main field-coils shunt.

Figure 2:
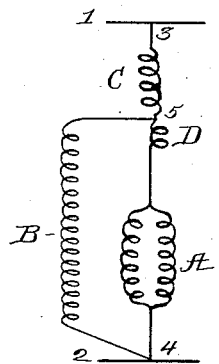
Figure 3:
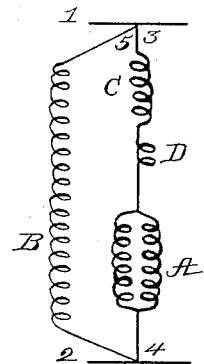
Figure 4:
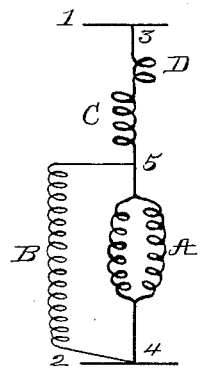
Figure 5:
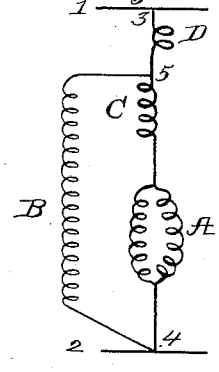
Figure 6:
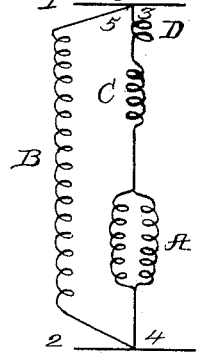

In Fig. 1 the main field-coils are shunted around the armature alone. In Fig. 2 the main coils are shunted around the armature and the cumulative series coils alone, the differential coils being outside the shunt-terminal. In Fig. 3 the shunt is around the armature and both the series sets. Fig. 4 is similar to Fig. 1, except that the positions of the two series sets are reversed. In Fig. 5 the shunt is around the armature and the differential series coils, the cumulative series coils being outside the terminal of the shunt. Fig. 6 is similar to Fig. 3, with the series coils reversed in position.

Figure 7:
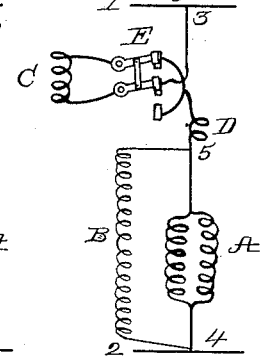

Fig. 7 shows means for varying the magnetizing effect of the differential series coils. Such means here consist of a short-circuiting and reversing switch, E. In starting the motor this switch has the position shown, the current in the differential coils being thus reversed, and the field being, therefore, very strong when the motor starts. The position of the switch is then changed to short-circuit the series coil and so weaken the field-magnet, and finally the coils are thrown in direct, so as to exert their usual effect.

Figure 8:
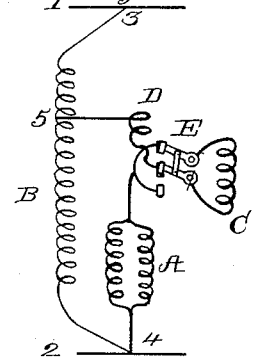

In Fig. 8 the terminal 5 of the armature-shunt is shown shifted to a different point of the main field-coils. This may be done by any suitable commutator, and the difference of potential at the armature-shunt terminals and the current in the armature are thereby varied, and also, if the series coils are inside the shunt-terminals, as in this figure, the magnetizing effect of such coils is varied.

In Fig. 9, F is an electro-dynamic motor, like that represented in Fig. 6, the two sets of series coils being both inside the shunt-terminals. The differential series coils are wound on two diagonally opposite legs of the field-magnet and the cumulative series coils on the other two legs. These coils act to regulate the speed of the motor under variable loads, and also to produce the counter-distortion and maintain the non sparking point constant in the manner which has been above explained. This is seen in Figs. 10, 11, and 12, wherein $x\ x$ is the line of the magnetic resultant. In Fig. 10 this line is at its normal position. In Fig. 11 it is shifted, as shown by a change in the armature-current, due to a variation in load, while in Fig. 12 the line is brought back to its original position by the counter-distortion, as has been fully explained.

For convenience of illustration the armature shown in these three figures is a Gramme ring. N S are the field-magnet poles. The dotted lines in the interpolar space represent the magnetic lines of force.

What I claim is—

1. In an electro-dynamic motor, the combination of the armature, main field-magnet coils in shunt relation to the armature, and differential field-magnet coils and cumulative field-magnet coils in series with the armature, substantially as set forth.

2. In an electro-dynamic motor, the combination of the armature, a set of differential field-magnet coils, and a set of cumulative field-magnet coils, both in series, with the armature and main field-magnet coils, shunted around one of said series sets, substantially as set forth.

3. In an electro-dynamic motor, the combination of the armature, a set of differential field-magnet coils, and a set of cumulative field-magnet coils, both in series with the armature and main field-magnet coils, shunted around the armature and said differential series set only, substantially as set forth.

4. In an electro-dynamic motor, the combination of the armature, differential field-magnet coils, and cumulative field-magnet coils, both in series with the armature, main field-magnet coils in shunt relation to the armature, and means for varying the magnetizing effect of said differential coils, substantially as set forth.

5. In an electro-dynamic motor, the combination, with the armature and main field-magnet coils in shunt relation to the armature, of differential field-magnet coils and cumulative field-magnet coils, both in series with the armature, said differential coils being arranged to produce their greatest effect on diagonally-opposite parts of the magnetic field, and said cumulative coils arranged to produce their greatest effect on other diagonally opposite parts of the field, substantially as set forth.

6. In an electro-dynamic motor, the combination, with the armature of main field-magnet coils in shunt relation to the armature wound equally on all parts, of the field-magnet, and differential field-magnet coils and cumulative field-magnet coils, both in series with the armature, said differential coils being arranged to produce their greatest effect on diagonally-opposite parts of the magnetic field, and said cumulative coils arranged to produce their greatest effect on other diagonally-opposite parts of the field, substantially as set forth.

7. In an electro-dynamic motor, the combination of the armature, main field-magnet coils in shunt relation to the armature, differential field-magnet coils, and cumulative field-magnet coils, both in series with the armature, and means for varying the armature-current, substantially as set forth.

This specification signed and witnessed this 28th day of February, 1885.

FRANK J. SPRAGUE.

Witnesses:
A. W. KIDDLE,
E. C. ROWLAND.